(12) United States Patent
Suidu et al.

(10) Patent No.: US 9,491,334 B2
(45) Date of Patent: Nov. 8, 2016

(54) IMAGING APPARATUS, IMAGING METHOD, ELECTRONIC DEVICE, AND PROGRAM

(71) Applicant: Sony Corporation, Tokyo (JP)

(72) Inventors: Sadamu Suidu, Fukuoka (JP); Daisuke Goto, Tokyo (JP); Hiroaki Tanaka, Kanagawa (JP); Yuuya Kani, Fukuoka (JP)

(73) Assignee: SONY CORPORATION, Tokyo (JP)

( * ) Notice: Subject to any disclaimer, the term of this patent is extended or adjusted under 35 U.S.C. 154(b) by 21 days.

(21) Appl. No.: 14/395,391

(22) PCT Filed: Apr. 25, 2013

(86) PCT No.: PCT/JP2013/062168
§ 371 (c)(1),
(2) Date: Oct. 17, 2014

(87) PCT Pub. No.: WO2013/168583
PCT Pub. Date: Nov. 14, 2013

(65) Prior Publication Data
US 2015/0116587 A1 Apr. 30, 2015

(30) Foreign Application Priority Data
May 11, 2012 (JP) .................. 2012-109339

(51) Int. Cl.
*H04N 5/217* (2011.01)
*H04N 5/361* (2011.01)
(Continued)

(52) U.S. Cl.
CPC ........ *H04N 5/2176* (2013.01); *H04N 5/23241* (2013.01); *H04N 5/361* (2013.01); *H04N 5/3698* (2013.01); *H04N 5/3765* (2013.01)

(58) Field of Classification Search
CPC ........... H04N 5/2176; H04N 5/23241; H04N 5/361; H04N 5/3698; H04N 5/3765
USPC ................. 348/312, 243, 372, 294, 316
See application file for complete search history.

(56) References Cited

U.S. PATENT DOCUMENTS 7,129,985 B1    10/2006  Koizumi et al.
2002/0144161 A1 10/2002  Takahashi et al.
(Continued)

FOREIGN PATENT DOCUMENTS

JP    2000-196947 A   7/2000
JP    2001-284588 A  10/2001
(Continued)

OTHER PUBLICATIONS

International Search Report; International Application No. PCT/JP2013/062168; Filing Date: Apr. 25, 2013. (Form PCT/ISA/210 and PCT/ISA/220 and PCT/ISA/237).
(Continued)

*Primary Examiner* — Nhan T Tran
(74) *Attorney, Agent, or Firm* — Chip Law Group

(57) ABSTRACT

The present technology relates to an imaging apparatus, an imaging method, an electronic device, and a program that can stabilize a clamp level at the time of imaging while realizing power saving of the imaging apparatus. In an imaging mode including a valid signal period in which a video signal imaged by an imaging device 51 is transferred and an invalid signal period in which the video signal is not transferred, the timing generation circuit 12 generates a vertical transfer clock signal, a horizontal transfer clock/horizontal final stage transfer clock signal, a reset gate clock signal, and an OB clamp clock signal so that a clamp level of the video signal does not vary, and the video signal imaged by the imaging device is transferred in the valid signal period and the video signal is not transferred in the invalid signal period. The present technology can be applied to an imaging apparatus.

8 Claims, 8 Drawing Sheets

(51) Int. Cl.
*H04N 5/232* (2006.01)
*H04N 5/369* (2011.01)
*H04N 5/376* (2011.01)

(56) References Cited

U.S. PATENT DOCUMENTS

| | | |
|---|---|---|
| 2003/0169358 A1 | 9/2003 | Tanimoto |
| 2007/0035650 A1* | 2/2007 | Suzuki .................. H04N 5/232 348/312 |
| 2007/0058057 A1 | 3/2007 | Futamura |
| 2008/0259214 A1* | 10/2008 | Tsumura ............. H03M 1/1295 348/572 |
| 2010/0213350 A1 | 8/2010 | Shikanai |
| 2012/0026374 A1* | 2/2012 | Kido .................... H04N 5/2353 348/332 |
| 2012/0274752 A1 | 11/2012 | Hashimoto et al. |

FOREIGN PATENT DOCUMENTS

| | | | | |
|---|---|---|---|---|
| JP | 2002-300479 A | 10/2002 | | |
| JP | 2003-264745 A | 9/2003 | | |
| JP | 2004-072602 A | 3/2004 | | |
| JP | 2004336473 A | * 11/2004 | ............. H04N 5/335 |
| JP | 2006-086757 A | 3/2006 | | |
| JP | 2010-199920 A | 9/2010 | | |
| JP | 2011-229010 A | 11/2011 | | |
| WO | WO-2012/020709 | 2/2012 | | |

OTHER PUBLICATIONS

Written Opinion of the International Searching Authority; International Application No. PCT/JP2013/062168; Dated: Jun. 11, 2013. (Form PCT/ISA/210 and PCT/ISA/220 and PCT/ISA/237).

* cited by examiner

IMAGING APPARATUS, IMAGING METHOD, ELECTRONIC DEVICE, AND PROGRAM

TECHNICAL FIELD

The present technology relates to an imaging apparatus, an imaging method, an electronic device, and a program, and especially relates to an imaging apparatus, an imaging method, an electronic device, and a program that suppresses variation of a clamp level and enables imaging of an image having favorable visual quality while realizing low power consumption.

BACKGROUND ART

In recent years, in imaging apparatuses such as digital still cameras, there is a plurality of modes including a low frame rate mode for capturing a still image, and a high frame rate mode for capturing a moving image and for liquid crystal monitor display.

Among these modes, especially in the high frame rate mode, the frame rate may sometimes be adjusted to match with a signal processing period of subsequent stages and the like, and thus a read/output system provided with an invalid signal period in which no video signal is output may sometimes be employed.

That is, when video signals of frames F1, F2, . . . are read at a predetermined frame rate, a waiting time may be caused after the frame F1 to be read has been read to timing when the frame F2 to be next read is read. Such a waiting time is the invalid signal period, and a period in which a video signal of each frame is read is a valid signal period. In the past, clock signals necessary for transfer of these video signals are output during both of the valid signal period and the invalid signal period.

However, in recent years, there have been strong demands for reduction of power consumption, and various proposals have been made. For example, a technology has been proposed, which stops the clock signals for reading the video signals during the invalid signal period because the invalid signal period having no video signal output does not require signal outputs from a solid-state imaging device, so that the power consumption is reduced (see Patent Document 1).

However, in the technology described in Patent Document 1, when the stopped clock signal for reading a video signal is re-started, a period in which a power supply current to a driver that is operated based on the clock signal becomes unstable occurs, and thus a clamp level that clamps a back level varies and the black level may become unstable.

Regarding this point, a technology to make the black level stable has been proposed (see Patent Document 2).

CITATION LIST

Patent Document

Patent Document 1: Japanese Patent Application No. 2001-284588
Patent Document 2: Japanese Patent Application Laid-Open No. 2004-072602

SUMMARY OF THE INVENTION

Problem to be Solved by the Invention

However, the technology described in Patent Document 2 is only applicable to a special image reading apparatus, and therefore, the technology is not general-purpose means applicable to overall imaging apparatuses.

The present technology has been made in view of the foregoing, and is especially applicable to overall imaging apparatuses. The present technology suppresses variation of a clamp level and enables imaging of an image having favorable visual quality with a stable black level, while realizing low power consumption.

Solution to Problems

An imaging apparatus according to a first aspect of the present technology includes: a clock signal generation unit configured to start generation of clock signals at predetermined timing when a clamp level does not vary, at a time of switching from a valid signal period in which an imaged video signal is transferred to an invalid signal period in which the video signal is not transferred.

The clock signal generation unit may generate predetermined clock signals, among the clock signals, from timing before the valid signal period by a predetermined time or from timing having passed from the invalid signal period by a predetermined time so that the clamp level of the video signal does not vary, and the imaged video signal is transferred in the valid signal period and the video signal is not transferred in the invalid signal period.

The imaging apparatus may further include: a driver configured to transfer the imaged video signal according to the clock signal generated by the clock signal generation unit; and a driver power supply unit configured to supply power to the driver, the driver power supply unit may start supply of power to the driver from timing before the valid signal period by a predetermined time from timing when the supply of power to the driver is started to timing when a current value flowing in the driver reaches a predetermined steady state, or from timing having passed for a predetermined time after having entered the invalid signal period, the predetermined time being from timing when the supply of power to the driver is started to timing when a current value flowing in the driver reaches a predetermined steady state, and the clock signal generation unit may generate the predetermined clock signals from timing before the valid signal period by a predetermined time from timing when the driver power supply unit starts the supply of power to the driver to timing when a current value flowing in the driver reaches a predetermined steady state, or from timing having passed for a predetermined time after having entered the invalid signal period, the predetermined time being from timing when the driver power supply unit starts the supply of power to the driver to timing when a current value flowing in the driver reaches a predetermined steady state.

The predetermined clock signals may include a vertical transfer clock signal, a horizontal transfer clock signal, a horizontal final stage transfer clock signal, and a reset gate clock signal.

The clock signal generation unit may further include an OB clamp clock signal generation unit configured to generate an optical black (OB) clamp clock signal, and the OB clamp clock signal generation unit may generate the OB clamp clock signal only during the valid signal period.

An imaging method according to the first aspect of the present invention includes: a step of performing clock signal generation processing of starting generation of clock signals at predetermined timing when a clamp level does not vary, at a time of switching from a valid signal period in which an imaged video signal is transferred to an invalid signal period in which the video signal is not transferred.

A program according to the first aspect of the present invention for causing a computer to execute processing includes: a clock signal generation step of starting generation of clock signals at predetermined timing when a clamp level does not vary, at a time of switching from a valid signal period in which an imaged video signal is transferred to an invalid signal period in which the video signal is not transferred.

An electronic device according to a second aspect of the present invention includes: a clock signal generation unit configured to start, at a time of switching from a valid signal period in which an imaged video signal is transferred to an invalid signal period in which the video signal is not transferred, generation of clock signals at predetermined timing when a clamp level of the video signal does not vary.

According to the first and second aspects of the present invention, at the time of switching from a valid signal period in which an imaged video signal is transferred, to an invalid signal period in which the video signal is not transferred, generation of clock signals is started at predetermined timing when a clamp level of the video signal does not vary.

The imaging apparatus and the electronic device of the present technology may be independent apparatus and device, or may be blocks that perform imaging processing.

Effects of the Invention

According to one aspect of the present technology, the technology is applicable to overall imaging apparatuses, and suppresses variation of a clamp level and enables imaging of an image having favorable visual quality with stable black level, while realizing low power consumption.

MODE FOR CARRYING OUT THE INVENTION

[Configuration Example of Embodiment of Imaging Apparatus]

Figure 1:
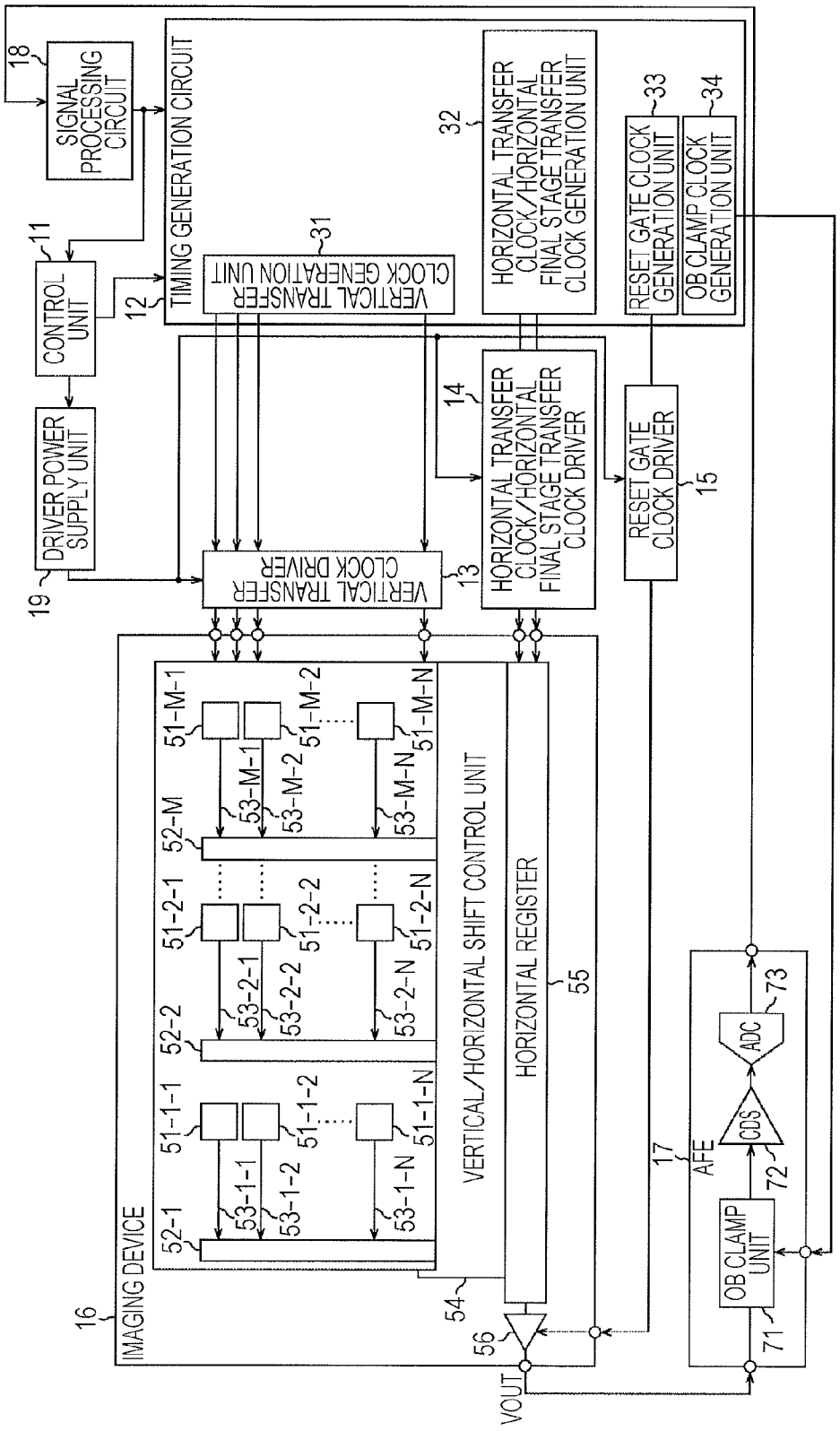
FIG. 1 is a block diagram illustrating a configuration example of an embodiment of an imaging apparatus to which the present technology is applied.

FIG. 1 illustrates a configuration example of an embodiment of an imaging apparatus to which the present technology is applied. The imaging apparatus of FIG. 1 images video, and outputs a video signal made of a digital signal.

The imaging apparatus includes a control unit 11, a timing generation circuit 12, a vertical transfer clock driver 13, a horizontal transfer clock/horizontal final stage transfer clock driver 14, a reset gate clock driver 15, an imaging device 16, an analog front end (AFE) 17, a signal processing circuit 18, and a driver power supply unit 19. The control unit 11 is configured from so-called a microcomputer made of a central processing unit (CPU), a read only memory (ROM), a random access memory (RAM), and the like, and controls the entire operation of the imaging apparatus by executing various programs.

The timing generation circuit 12 is controlled by the control unit 11, and generates clock signals for adjusting timing necessary for various types of processing, and supplies the clock signals to the vertical transfer clock driver 13, the horizontal transfer clock/horizontal final stage transfer clock driver 14, the reset gate clock driver 15, the imaging device 16, and the AFE 17. The imaging device 16 of FIG. 1 is so-called a charged coupled device (CCD), and sequentially outputs video signals made of pixel signals in pixel units, the pixel signals being obtained such that a sensor unit 51 made of photodiodes that configure the CCD receives light and photoelectric conversion is applied thereto.

More specifically, the timing generation circuit 12 includes a vertical transfer clock generation unit 31, a horizontal transfer clock/horizontal final stage transfer clock generation unit 32, a reset gate clock generation unit 33, and an OB clamp clock generation unit 34.

The vertical transfer clock generation unit 31 generates and supplies, to the vertical transfer clock driver 13, vertical transfer clocks to vertical registers 52-1 to 52-M that transfers charges read from sensor units 51-1-1 to 51-M-N made of photodiodes through read-out gates 53-1-1 to 53-M-N. That is, the vertical registers 52-1 to 52-M sequentially transfer, to the vertical/horizontal shift control unit 54 in each column, the charges accumulated in the sensor units 51-1-1 to 51-M-N in the imaging device 16 by photoelectric conversion as pixel signals, and read through the read-out gates 53-1-1 to 53-M-N. At this time, the vertical transfer clock driver 13 generates a Hi-level or Low-level vertical transfer signal according to the vertical transfer clocks supplied from the vertical transfer clock generation unit 31, to each of the vertical registers 52-1 to 52-M. The vertical registers 52-1 to 52-M sequentially transfer, to the vertical/horizontal shift control unit 54, the charges read from the sensor units 51-1-1 to 51-M-N through the read-out gates 53-1-1 to 53-M-N, in response to the vertical transfer signals from the vertical transfer clock driver 13. The vertical/horizontal shift control unit 54 sequentially transfers the charges transferred from the vertical registers 52-1 to 52-M to the horizontal register 55.

Note that, when the sensor units 51-1-1 to 51-M-N, the vertical registers 52-1 to 52-M, and the read-out gates 53-1-1 to 53-M-N are not especially necessarily distinguished from one another, they are simply called sensor unit 51, vertical register 52, and read-out gate 53, respectively, and other configurations are also similarly called. Further, FIG. 1 illustrates an example in which the sensor units 51 are arranged in an N-by-M array, and M columns of the vertical registers 52 are arranged. However, the number of sensor units 51 may be more than the number of rows and columns of the example.

The horizontal transfer clock/horizontal final stage transfer clock generation unit 32 generates and supplies a horizontal transfer clock or a horizontal final stage transfer clock to the horizontal transfer clock/horizontal final stage transfer clock driver 14. The horizontal transfer clock/horizontal final stage transfer clock driver 14 generates a Hi-level or Low-level horizontal transfer signal for driving the horizontal register 55 based on the horizontal transfer clock, and supplies the generated signal to the horizontal register of the imaging unit 16. Note that the horizontal transfer clock/horizontal final stage transfer clock driver 14 maybe divided into a horizontal transfer clock driver and a horizontal final stage transfer clock driver, and the respective drivers may be separately provided. The horizontal register 55 transfers the charge supplied from the vertical/horizontal shift control unit 54 in the horizontal direction based on the horizontal transfer signal from the horizontal transfer clock/horizontal final stage transfer clock driver 14, and sequentially supplies the charge to the charge-voltage conversion unit 56. The charge-voltage conversion unit 56 converts the charge into a voltage, and outputs the pixel signal as an output voltage VOUT. Further, the horizontal transfer clock/horizontal final stage transfer clock generation unit 32 generates a horizontal final stage transfer clock that indicates completion of charge transfer of one row, and supplies the generated clock to the horizontal transfer clock/horizontal final stage transfer clock driver 14. The horizontal transfer clock/horizontal final stage transfer clock driver 14 generates a Hi-level or Low-level horizontal final stage transfer signal that indicates completion of charge transfer of one row based on the horizontal final stage clock. The horizontal register 55 recognizes the charges of one row has been transferred in the horizontal direction based on the horizontal final stage transfer signal, and receives charges of new row from the vertical/horizontal shift control unit 54 and then transfers the charges in the horizontal direction based on the horizontal transfer clock.

The reset gate clock generation unit 33 generates a reset gate clock signal for the charge-voltage conversion unit 56, the signal indicating timing to once reset the accumulated charge in converting the charge into the voltage, and supplies the generated signal to the reset gate clock driver 15. The reset gate clock driver 15 generates a Hi-level or Low-level reset gate signal for driving the reset gate based on the reset gate clock signal, and supplies the generated signal to the charge-voltage conversion unit 56. The charge-voltage conversion unit 56 releases and resets the charge accumulated in itself based on the reset gate signal.

Here, prior to describing the optical black (OB) clamp clock generation unit 34, a configuration of the AFE 17 will be described first. The analog front end (AFE) 15 performs optical black (OB) clamp of the pixel signal supplied from the imaging device 16 in pixel units to enable black to be accurately reproduced, removes a reset noise and an amplifier noise, converts the pixel signal into a digital signal, and outputs the digital signal. To be specific, the AFE 17 includes an OB clamp unit 71, a CDS 72, and an ADC 73.

The optical black (OB) clamp clock generation unit 34 generates and supplies an OB clamp clock signal that indicates timing of transfer, to the OB clamp unit 71 of the AFE 17, which transfers the OB clamp signal. The OB clamp unit 71 clamps a pixel signal of a shading area as a black level, from among the pixel signals supplied from the imaging device 16, based on the OB clamp clock signal, and outputs the pixel signal to the CDS 72.

The correlated double sampling (CDS) 72 removes an amplifier noise and a reset noise of the pixel signal supplied from the OB clamp unit 71 by the correlated double sampling method, and outputs the pixel signal to the ADC 73.

The analog digital converter (ADC) 73 converts the analog pixel signal from which the noises have been removed and supplied from the CDS 72, into a digital pixel signal, and outputs the digital pixel signal to the signal processing circuit 18.

The signal processing circuit 18 outputs the digitalized pixel signal from the AFE 17 and notifies the control unit 11 and the timing generation circuit 12 of a processing state based on the pixel signal from the AFE 17, and generates an appropriate clock signal.

The driver power supply unit 19 supplies power necessary for driving the vertical transfer clock driver 13 under control of the control unit 11.

Note that, in the imaging apparatus of FIG. 1, an example in which the AFE, the timing generation circuit, and the driver are configured from individual blocks has been described. However, these elements may be configured from an integrated-circuit of the same chip. Similarly, the signal processing circuit and the control unit may also be configured from an integrated-circuit of the same chip. Further, the above-described separate blocks of the AFE, the timing generation circuit, and the driver as a whole, or a part of the separate blocks may be configured from an integrated-circuit of the same chip of the integrated circuit of the signal processing circuit and the control unit.

Next, an operation of the imaging apparatus of FIG. 1 will be described.

The sensor unit 51 made of photodiodes accumulates a charge by photoelectric conversion that converts light received in a predetermined period into a charge. After the predetermined period has passed, the read-out gate 53 is released, so that the accumulated charge is read to the vertical register 52. The vertical transfer clock generation unit 31 in the timing generation circuit 12 generates the vertical transfer clock signal that indicates timing of vertical transfer, and supplies the generated signal to the vertical transfer clock driver 13. The vertical transfer clock driver 13 drives the vertical register 52 based on the vertical transfer clock signal, and sequentially transfers the charge read from the sensor unit 51 to the vertical/horizontal shift control unit 54 in row units.

The vertical/horizontal shift control unit 54 transfers the charges transferred from the vertical registers 52-1 to 52-M in row units to the horizontal register 55.

The horizontal register 55 sequentially transfers the charge in the horizontal direction based on the horizontal transfer signal supplied from the horizontal transfer clock/horizontal final stage transfer clock driver 14, and supplies the charge to the charge-voltage conversion unit 56. Further, the horizontal register 55 recognizes completion of charge transfer in row units based on the horizontal final stage transfer signal supplied from the horizontal transfer clock/horizontal final stage transfer clock driver 14, and acquires charges of a new row from the vertical/horizontal shift control unit 54.

The charge-voltage conversion unit 56 converts the charge accumulated in each transferred pixel into a voltage, and supplies the voltage to the AFE 17 as a pixel signal made of a voltage signal. At this time, the charge-voltage conversion unit 56 releases the reset gate based on the reset gate signal supplied from the reset gate clock driver 15, and releases and resets the accumulated charges.

The OB clamp unit 71 of the AFE 17 clamps the black level based on the pixel signal corresponding to the pixel provided in the shaded optical black (OB) area, based on the OB clamp clock signal supplied from the OB clamp clock generation unit 34, and supplies the pixel signal to the CDS 72. The CDS 72 removes the amplifier noise and the reset noise from the pixel signal by the correlated double sampling, and supplies the pixel signal to the ADC 73. The ADC 73 converts the analog pixel signal from which the noises have been removed into a digital pixel signal, and outputs the digital pixel signal.

With the above processing, the pixel signals of the pixels that configure the image imaged by the imaging device 16 are output as pixel signals of digital signals. Note that, in the configuration of FIG. 1, an example in which the OB clamp unit 71 is provided at a preceding stage of the CDS 72 in the AFE 17 has been illustrated. However, the OB clamp unit 71 may be provided at a subsequent stage of the CDS 72 or of the ADC 73.

[Clock Signal Control Processing]

Figure 2:
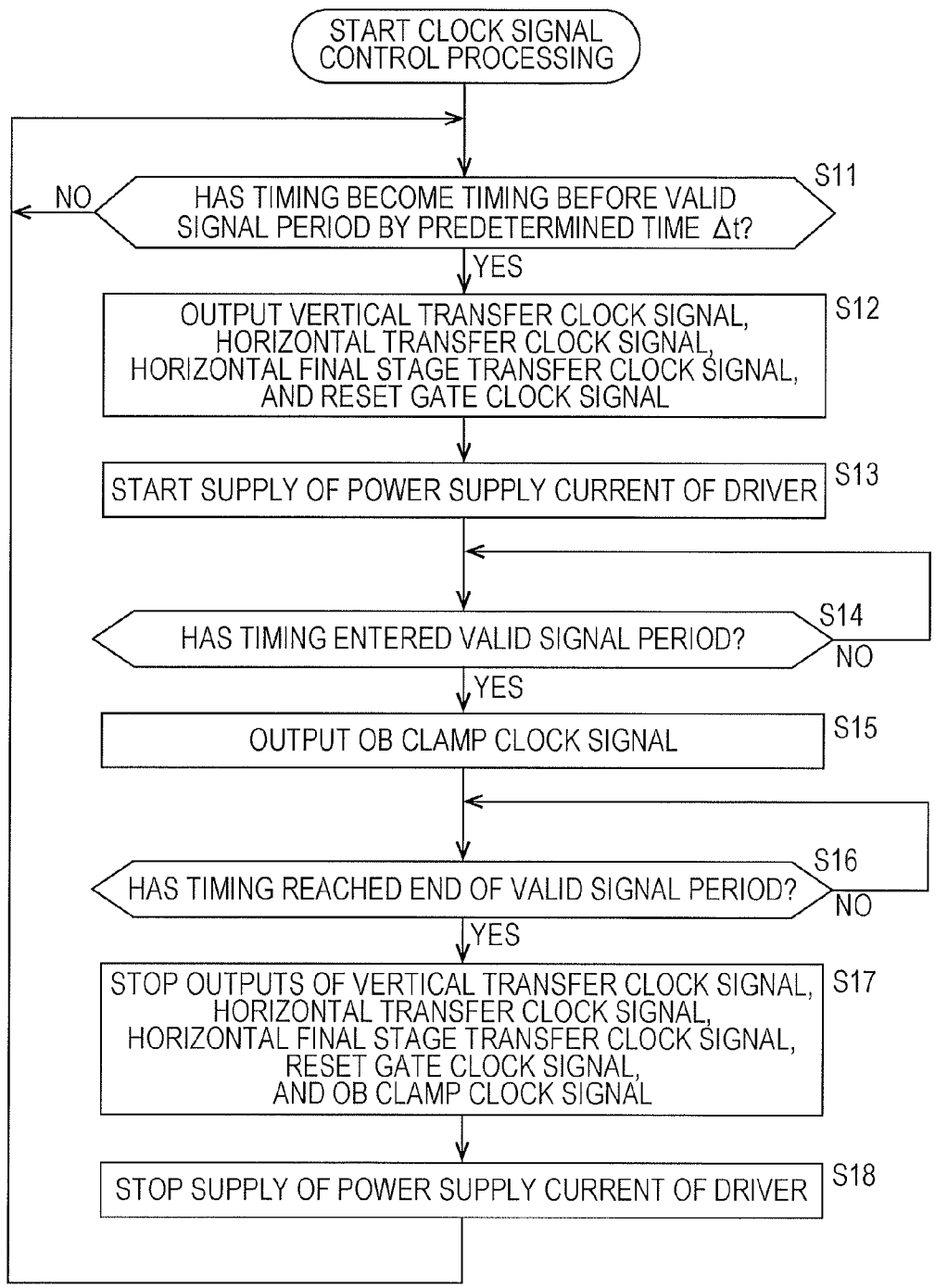
FIG. 2 is a flowchart describing clock control processing by the imaging apparatus of FIG. 1.

Next, clock signal control processing in the imaging apparatus of FIG. 1 will be described with reference to the flowchart of FIG. 2.

In step S11, the control unit 11 determines whether timing has become timing before the valid signal period in which the pixel signal should be output by a predetermined time Δt, and repeats similar processing until timing has become considered the timing. Then, in step S11, when timing has become considered the timing before the valid signal period by the predetermined time Δt, the processing proceeds to step S12. That is, as illustrated in FIG. 3, when timing has become a time t0 or t12 that is a time just before the time t1 or t3 by the time Δt, where the time t1 or t3 is a start time of the valid signal period, the processing proceeds to step S12.

Figure 3:
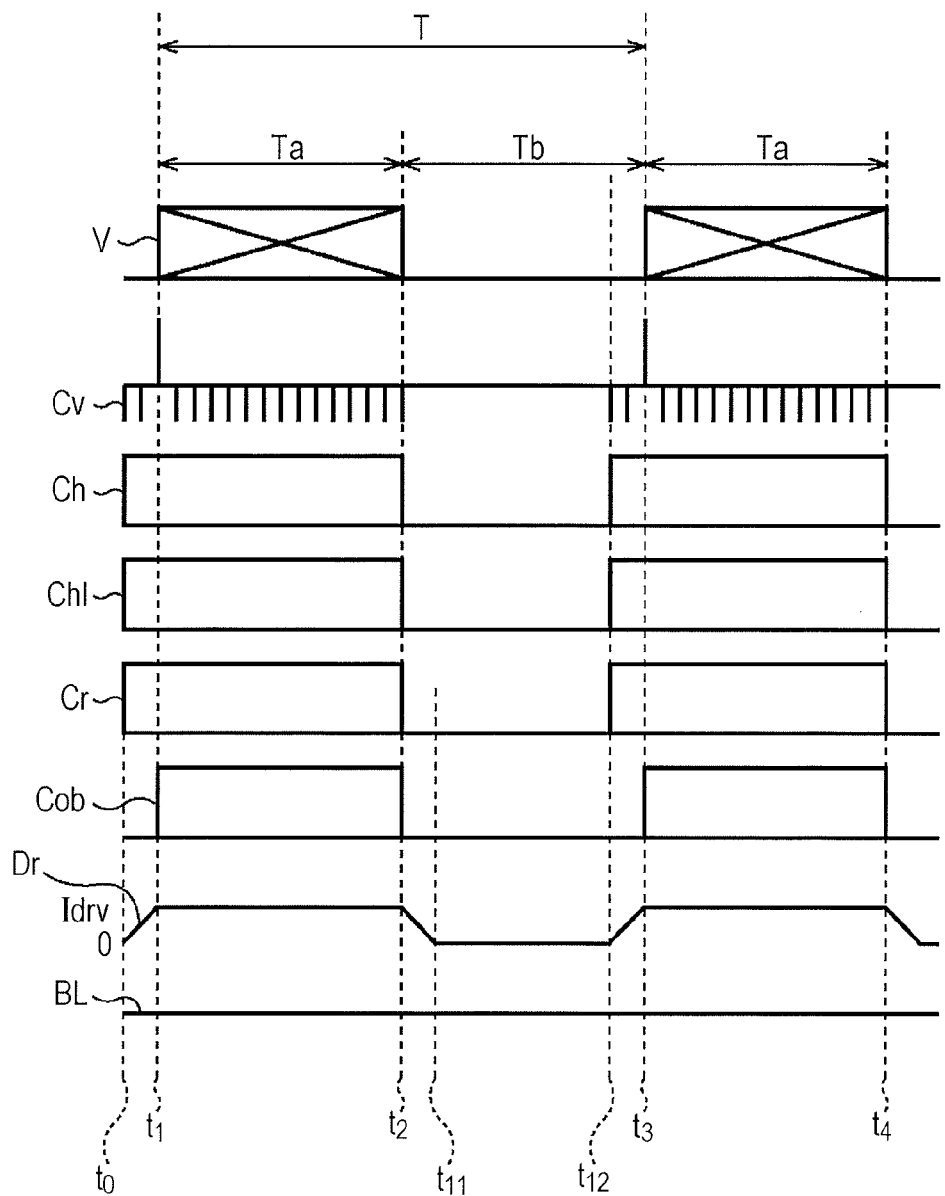
FIG. 3 is waveforms illustrating various clock signals, a driver power supply current, and an OB clamp level for describing the clock control processing by the imaging apparatus of FIG. 1.

Note that, in FIG. 3, from the top, a waveform V that indicates the valid signal period or the invalid signal period of the pixel signal, waveforms of the vertical transfer clock signal Cv, the horizontal transfer clock signal Ch, the horizontal final stage transfer clock signal Chl, the reset gate clock signal Cr, and the OB clamp clock signal Cob, a waveform indicating the driver power supply current Dr, and a waveform indicating the OB clamp level BL, are respectively illustrated. Further, the waveform V indicates that the period of the Hi-level is the valid signal period, and the period of the Low-level is the invalid signal period. Further, as for the waveform of the driver power supply current Dr, a steady current value is indicated by the level of Idrv, and a state of OFF, that is, a state where no power is supplied is indicated by the level of 0.

In step S12, the control unit 11 instructs the timing generation circuit 12 to generate the clock signals. The timing generation circuit 12 controls the vertical transfer clock generation unit 31, the horizontal transfer clock/ horizontal final stage transfer clock generation unit 32, and the reset gate clock generation unit 33 to generate a vertical transfer clock signal, a horizontal transfer clock signal, a horizontal final stage transfer clock signal, and a reset gate clock signal.

In step S13, the control unit 11 controls the driver power supply unit 19 to supply power to the vertical transfer clock driver 13.

As a result, as illustrated in FIG. 3, from the time t0, the vertical transfer clock signal Cv, the horizontal transfer clock signal Ch, the horizontal final stage transfer clock signal Chl, and the reset gate clock signal Cr are generated. Further, at the time t0, a current value of the driver power supply current Dr supplied to the vertical transfer clock driver 13, the horizontal transfer clock/horizontal final stage transfer clock driver 14, and the reset gate clock driver 15 starts to rise in a gradual manner, and makes transition to a current value Idry in a steady state at the time t1 when timing enters the valid signal period. Further, the time Δt referred here is a time from when the driver power supply unit 19 stars to supply power to the vertical transfer clock driver 13, the horizontal transfer clock/horizontal final stage transfer clock driver 14, and the reset gate clock driver 15, to when the driver power supply current Dr comes to have the current value Idry in the steady state.

In step S14, the control unit 11 determines whether timing has become the valid signal period, and repeats similar processing until timing has become considered the valid signal period. For example, as illustrated in FIG. 3, the control unit 11 determines whether timing is on or after the time t0 or t12, and has become the time t1 or t3. Then, in step S14, when timing has become considered the valid signal period, that is, when timing is on or after the time t0 or t12, and has become considered the time t1 or t3, the processing proceeds to step S15.

In step S15, the control unit 11 instructs the timing generation circuit 12 to generate the OB clamp clock. In response to the instruction, the timing generation circuit 12 controls the OB clamp clock generation unit 34 to generate the OB clamp clock signal. With the processing, the OB clamp clock signal Cob is generated from the time t1 or t3, as illustrated in FIG. 3.

Further, at the timing of the time t1 or t3, the current value of the power supplied to the vertical transfer clock driver 13 to the reset gate clock driver 15 becomes the current value Idry in the steady state, as described above. Therefore, the vertical transfer clock driver 13 to the reset gate clock driver 15 respectively generate Hi-level or Low-level control signals for controlling the vertical registers 52-1 to 52-M, the horizontal register 55, and the charge-voltage conversion unit 56, based on the vertical transfer clock signal, the horizontal transfer clock signal/horizontal final stage transfer clock signal, and the reset gate clock signal from the vertical transfer clock generation unit 31, the horizontal transfer clock/horizontal final stage transfer clock generation unit 32, and the reset gate clock generation unit 33, whereby the charges accumulated in the sensor unit 51 and sequentially read through the read-out gate 53 can be sequentially transferred as pixel signals.

In step S16, the control unit 11 determines whether timing has reached the end of the valid signal period, and repeats similar processing until the end of the valid signal period has been determined. That is, in step S16, the control unit 11 determines whether timing has become the time t2 or t4 in FIG. 3, so that the valid signal period has ended, for example. In step S16, when timing has become considered the time t2 or t4 of FIG. 3, and the valid signal period has considered ended, the processing proceeds to step S17.

In step S17, the control unit 11 instructs the timing generation circuit 12 to stop generation of the clock signals. The timing generation circuit 12 controls the vertical transfer clock generation unit 31, the horizontal transfer clock/ horizontal final stage transfer clock generation unit 32, the reset gate clock generation unit 33, and the OB clamp clock generation unit 34 to stop generation of the vertical transfer clock signal, the horizontal transfer clock signal, the horizontal final stage transfer clock signal, the reset gate clock signal, and the OB clamp clock signal. As a result, as illustrated in FIG. 3, at the time t2 or t4, the vertical transfer clock signal Cv, the horizontal transfer clock signal Ch, the horizontal final stage transfer clock signal Chl, the reset gate clock signal Cr, and the OB clamp clock signal Cob are stopped.

In step S18, the control unit 11 controls the driver power supply unit 19 to stop supply of the power supply to the vertical transfer clock driver 13 to the reset gate clock driver 15, and the processing returns to step S11. That is, the driver power supply unit 19 stops the power supply at the time t2, whereby the drive power supply current Dr flowing in the vertical transfer clock driver 13 to the reset gate clock driver 15 is gradually decreased from the current value Idry in the steady state, and becomes 0 at the time t11 after a predetermined time has passed, as illustrated in FIG. 3.

With the above processing, the OB clamp level BL can be constantly maintained, as illustrated in FIG. 3.

Figure 4:
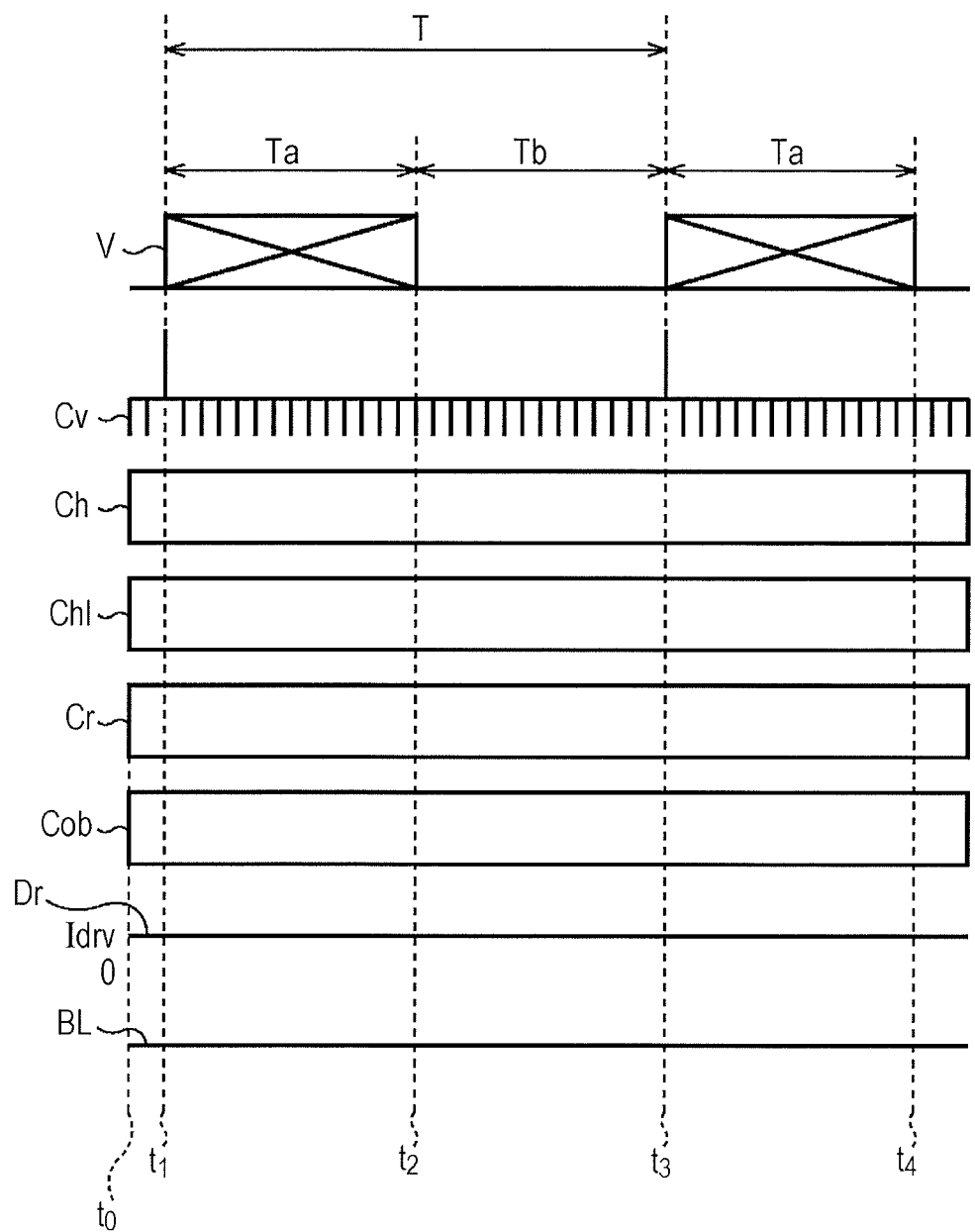
FIG. 4 is waveforms illustrating various clock signals, a driver power supply current, and an OB clamp level for describing clock control processing by a conventional imaging apparatus.

That is, in the past, all of the vertical transfer clock signal Cv, the horizontal transfer clock signal Ch, the horizontal final stage transfer clock signal Chl, the reset gate clock signal Cr, the OB clamp clock signal Cob, and the driver power supply current Dr are continuously generated and supplied from the time t2 to t3 that are in the invalid signal period, as illustrated in FIG. 4. In this case, the signals and the power supply are unchanged, and thus as for the OB clamp level BL, the constant state without any change is continuously maintained in a similar manner.

Figure 5:
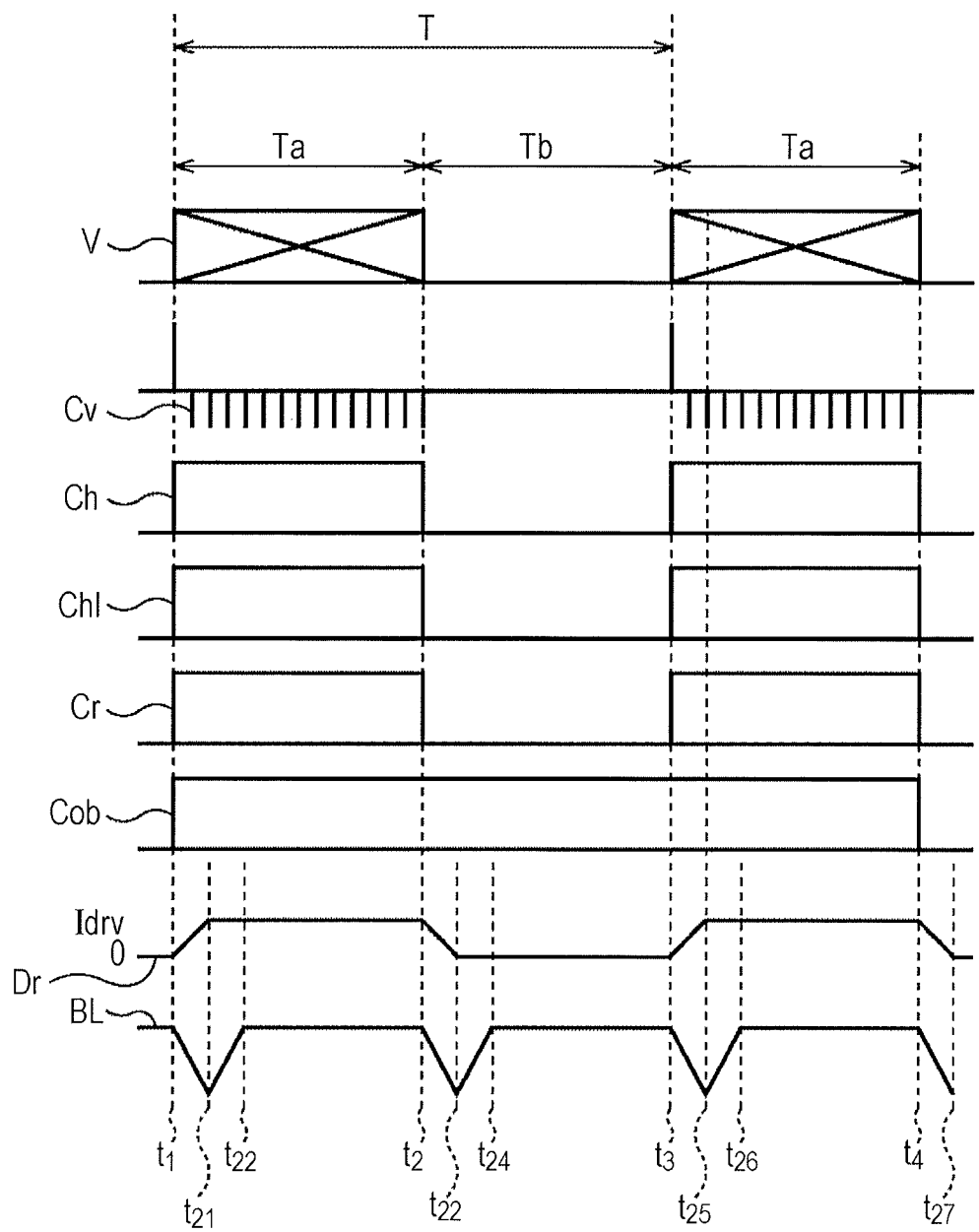
FIG. 5 is waveforms illustrating various clock signals, a driver power supply current, and an OB clamp level for describing clock control processing by a conventional imaging apparatus that is improved to be a power-saving type imaging apparatus of FIG. 4.
Figure 6:
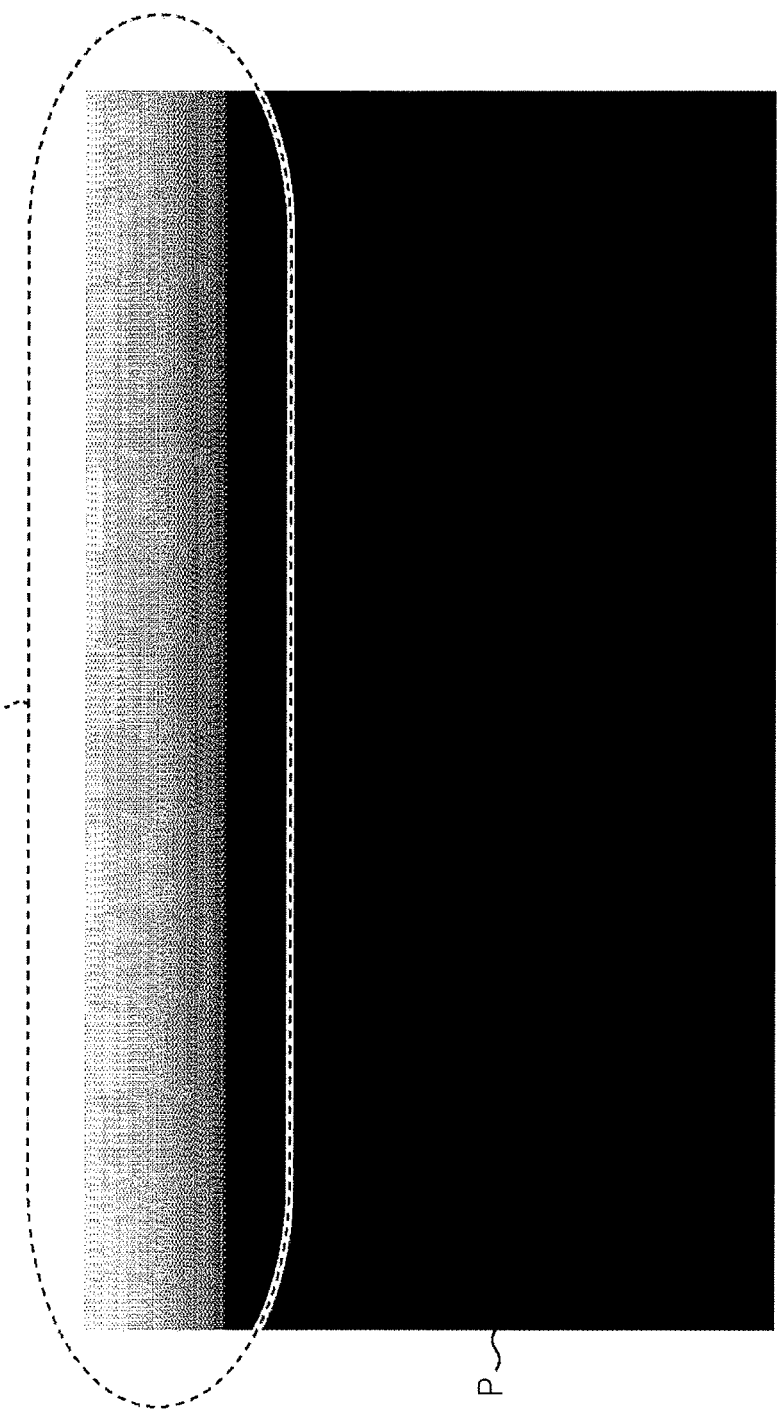
FIG. 6 is a diagram illustrating a display image example of when the OB clamp level becomes unstable.

Afterwards, to enhance the power saving and to extend the time to be able to be driven by a battery, as illustrated in FIG. 5, improvement has been made regarding the invalid signal period such that generation of the clock signals other than the OB clamp clock signal Cob, among the vertical transfer clock signal Cv, the horizontal transfer clock signal Ch, the horizontal final stage transfer clock signal Chl, the reset gate clock signal Cr, the OB clamp clock signal Cob, and the driver power supply current Dr, is stopped, whereby the power saving is enhanced in the improved conventional imaging apparatus. However, at this time, as for the driver power supply current Dr, variation illustrated by the waveform of the OB clamp level BL may sometimes be caused in a transition period until the current value supplied to the vertical transfer clock driver 13 to the reset gate clock driver 15 is transferred to the steady state, as illustrated by the time t1 to t21, the time t21 to t22, the time t2 to t23, the time t23 to t24, the time t3 to t25, and the time t25 to t26 of FIG. 5. With such variation, as illustrated by the image P of FIG. 6, the image may have an unstable and not favorable visual quality such as a part of a black area being brightly displayed, like the area Z at the upper part of the image P surrounded by the dotted line, for example.

Therefore, in the imaging apparatus of FIG. 1, as illustrated in FIG. 3, the power supply is started in a period from when the driver power supply unit 19 starts supply of power to the vertical transfer clock driver 13 to the reset gate clock driver 15 to when the current value becomes the steady state, that is, just before the valid signal period by the predetermined time Δt. Accordingly, the current value of the power supplied to the vertical transfer clock driver 13 to the reset gate clock driver 15 can be reliably maintained in the steady state during the valid signal period.

Further, the OB clamp clock generation unit 34 generates the OB clamp clock signal only during the valid signal period in which the power supply current Dr supplied from the driver power supply unit 19 to the vertical transfer clock driver 13 to the reset gate clock driver 15 is in the steady state. Accordingly, during a period other than the valid signal period, in which the driver power supply current Dr supplied to the vertical transfer clock driver 13 to the reset gate clock driver 15 is in an unstable state, the OB clamp clock signal is not generated, and the OB clamp clock signal is generated only during the valid signal period in which the driver power supply current Dr becomes the steady state. Therefore, the OB clamp level can be stabilized.

Figure 7:
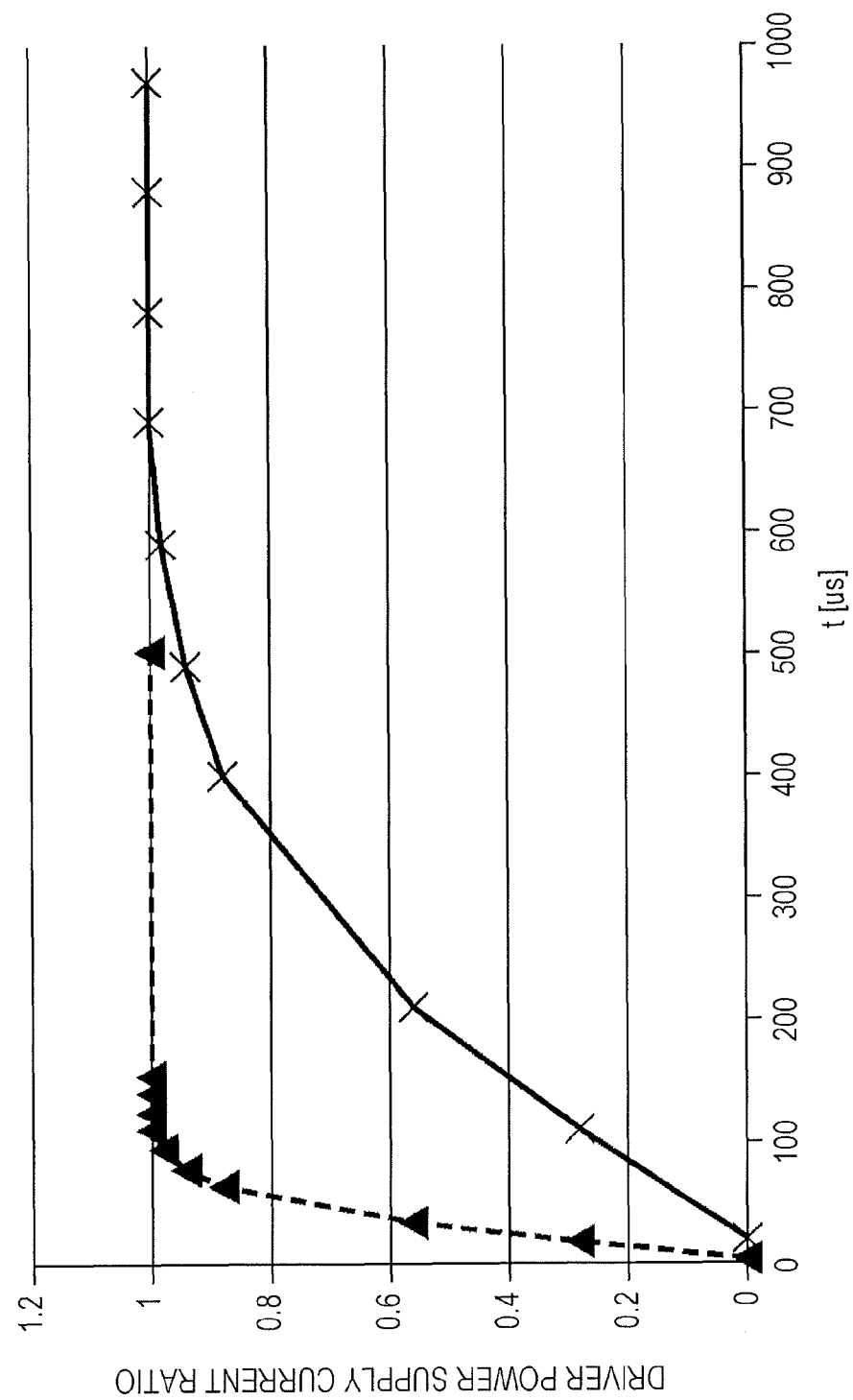
FIG. 7 is a diagram describing setting of a predetermined time Δt.

The predetermined time Δt needs to be set according to load capacities of bases of the vertical transfer clock driver 13 to the reset gate clock driver 15. That is, regarding the vertical transfer clock driver 13 to the reset gate clock driver 15 made of relatively low load capacity bases, the predetermined time Δt is set to a time Δt1 of about 100 μs, as illustrated by the waveform plotted with the black triangle marks of FIG. 7, for example. Meanwhile, regarding the vertical transfer clock driver 13 to the reset gate clock driver 15 made of relatively high load capacity bases, the predetermined time Δt is set to a time Δt2 of about 700 μs, as illustrated by the waveform plotted with the x-marks of FIG. 7, for example. Here, FIG. 7 illustrates waveforms where the vertical axis is a ratio of the driver power supply current to the current value Idry in the steady state, and the horizontal axis is an elapsed time t (μs) from timing when the driver power supply unit 19 is turned ON. That is, FIG. 7 illustrates, while the vertical transfer clock driver 13 to the reset gate clock driver 15 having relatively low load capacity bases require about 100 μs for the driver power supply current Dr to reach the steady state, the vertical transfer clock driver 13 to the reset gate clock driver 15 having relatively high load capacity bases require a time of about 700 μs to reach the steady state.

An example has been described, in which the vertical transfer clock signal Cv, the horizontal transfer clock signal Ch, the horizontal final stage transfer clock signal Chl, and the reset gate clock signal Cr are generated at the timing before entering the valid signal period by the predetermined time Δt, and the power supply is started from the driver power supply unit 19 to the vertical transfer clock driver 13 to the reset gate clock driver 15. However, as illustrated in FIG. 3, the load capacities of the vertical transfer clock driver 13 to the reset gate clock driver 15 are not so frequently changed, and also the valid signal period and the invalid signal period are fixed to a time Ta and a time Tb (T=Ta+Tb), respectively.

Therefore, if once it is determined, the elapsed time is measured from the timing when the invalid signal period is started, and when timing has passed to a time that has become the timing before the timing of the end of the invalid signal period by the predetermined time it, the vertical transfer clock signal Cv, the horizontal transfer clock signal Ch, the horizontal final stage transfer clock signal Chl, and the reset gate clock signal Cr may be generated and the driver power supply unit 19 may start the power supply.

That is, in any case, the period from the timing when the driver power supply unit 19 starts the power supply to the vertical transfer clock driver 13 to the reset gate clock driver 15, to the timing when the driver power supply current Dr becomes the steady state is caused not to be included in the valid signal period, the driver power supply current Dr is caused to be able to maintain the steady state in the entire valid signal period, and the OB clamp clock signal Cob is generated only during the valid signal period. In doing so, the OB clamp level BL can be maintained in the stable state in the entire period while the power saving is realized.

An example in which the imaging device 16 is a CCD has been described. However, the imaging device 16 may be another imaging device, and may be a complementary metal oxide semiconductor (CMOS), for example. That is, when a CMOS is used as the imaging device 16 instead of the CCD, the clock signal to be input to an output load MOS gate and an operation of a column analog digital converter (ADC) are stopped, so that similar effects can be obtained.

The technology is applicable to overall imaging apparatuses, as described above, and suppresses variation of the clamp level and enables imaging of an image having favorable visual quality with a stable black level, while realizing low power consumption.

By the way, the above-described series of processing can be executed by hardware, and also can be executed by software. When the series of processing is executed by software, a program that configures the software is installed from a recording medium to a computer incorporated in dedicated hardware, or a general-purpose personal computer capable of executing various functions by being installed various programs.

Figure 8:
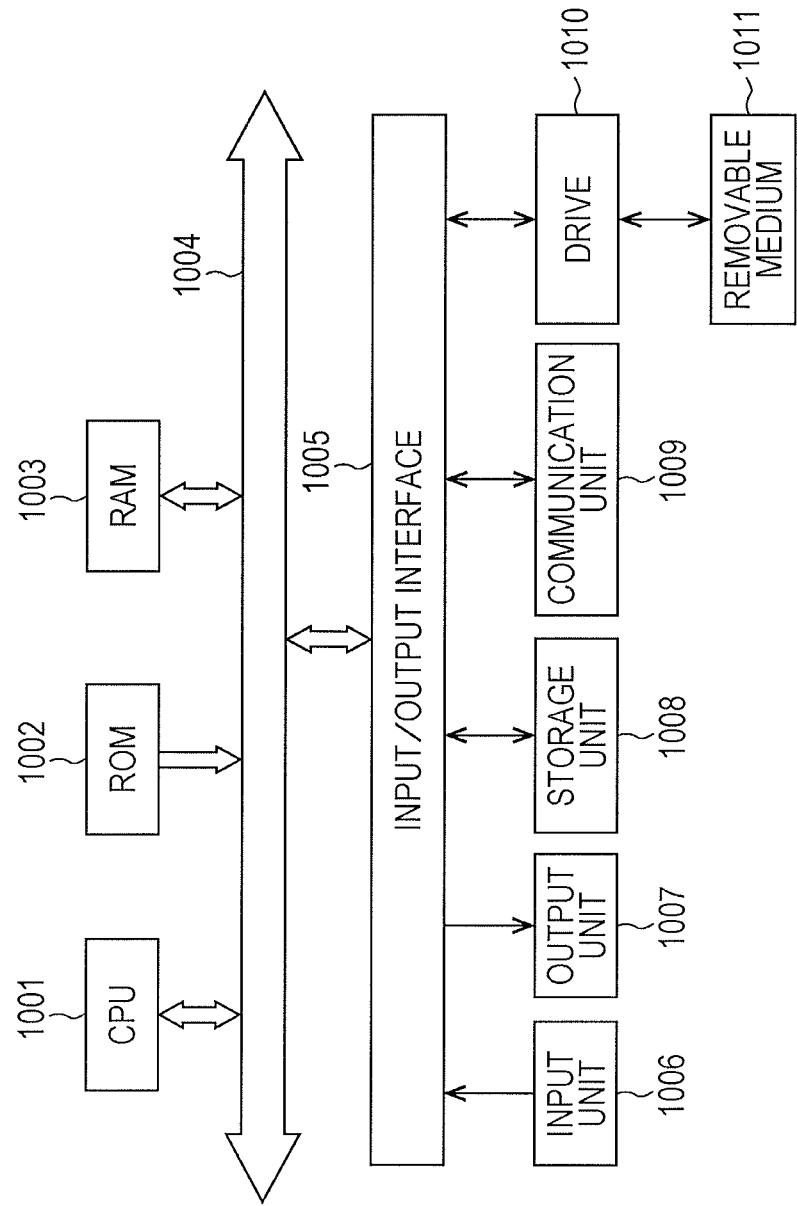
FIG. 8 is a diagram describing a configuration example of a general-purpose personal computer.

FIG. 8 illustrates a configuration example of a general-purpose personal computer. The personal computer houses a central processing unit (CPU) 1001. An input/output interface 1005 is connected to the CPU 1001 through a bus 1004. A read only memory (ROM) 1002 and a random access memory (RAM) 1003 are connected to the bus 1004.

To the input/output interface 1005, an input unit 1006 made of input devices such as a keyboard and a mouse for inputting operation commands by the user, an output unit 1007 that outputs images of a processing operation screen and a processing result to a display device, a storage unit 1008 made of a hard disk drive and the like that store programs and various data, and a communication unit 1009 made of a local area network (LAN) adaptor, and the like and executing communication processing though a network represented by the Internet are connected. Further, a drive 1010 that reads/writes data from/to a removable medium 1011 such as a magnetic disk (including a flexible disk), an optical disk (a compact disc-read only memory (CD-ROM) or digital versatile disc (DVD)), a magneto-optical disk (including a mini disc (MD)), or a semiconductor memory, is connected to the input/output interface 1005.

The CPU 1001 executes various types of processing according to the program stored in the ROM 1002, or the program read from the removable medium 1011 such as a magnetic disk, an optical disk, a magneto-optical disk, or a semiconductor memory, installed to the storage unit 1008, and loaded to the RAM 1003 from the storage unit 1008. Further, data necessary for the CPU 1001 to execute the various types of processing is also appropriately stored in the RAM 1003.

In the computer configured as described above, the CPU 1001 loads the program stored in the storage unit 1008 to the RAM 1003 through the input/output interface 1005 and the bus 1004, and executes the program, so that the above-described series of processing is performed.

The program executed by the computer (CPU 1001) can be provided by being recorded in the removable medium 1011 as a package medium. Further, the program can be provided through a wired or wireless transmission medium such as a local area network, the Internet, or digital satellite broadcasting.

In the computer, the program can be installed to the storage unit 1008 through the input/output interface 1005 by the removable medium 1011 being mounted to the drive 1010. Further, the program can be received by the communication unit 1009 through a wired or wireless transmission medium, and can be installed to the storage unit 1008. In addition, the program can be installed to the ROM 1002 or the storage unit 1008 in advance.

Note that the program executed by the computer may be a program, processing of which is performed in time series according to the order described in the present specification, or may be a program, processing of which is performed in parallel, or performed at necessary timing such as when being called.

Further, the system in the present specification means a set of a plurality of configuration elements (devices, modules (parts), and the like), regardless of whether all of the configuration elements exist in the same housing. Therefore, a plurality of devices stored in separate housings and connected through the network, and a single device having a plurality of modules stored in a single housing are both systems.

Note that embodiments of the present technology are not limited to the above-described embodiments, and various changes can be made without departing from the gist of the present technology.

For example, the present technology can employ a configuration of cloud computing in which one function is shared and cooperatively processed by a plurality of devices through the network.

Further, the steps described in the flowchart can be shared and executed by a plurality of devices, other than executed by a single device.

Further, when a plurality of pieces of processing is included in one step, the plurality of pieces of processing included in the one step can be shared and executed by a plurality of devices, other than executed by a single device.

Note that the present technology can employ the following configurations.

(1) An imaging apparatus including:

a clock signal generation unit configured to start generation of clock signals at predetermined timing when a clamp level does not vary, at a time of switching from a valid signal period in which an imaged video signal is transferred to an invalid signal period in which the video signal is not transferred.

(2) The imaging apparatus according to (1), wherein the clock signal generation unit generates predetermined clock signals, among the clock signals, from timing before the valid signal period by a predetermined time or from timing having passed from the invalid signal period by a predetermined time so that the clamp level of the video signal does not vary, and the imaged video signal is transferred in the valid signal period and the video signal is not transferred in the invalid signal period.

(3) The imaging apparatus according to (1) or (2), further including:

a driver configured to transfer the imaged video signal according to the clock signal generated by the clock signal generation unit; and a driver power supply unit configured to supply power to the driver, wherein the driver power supply unit starts supply of power to the driver from timing before the valid signal period by a predetermined time from timing when the supply of power to the driver is started to timing when a current value flowing in the driver reaches a predetermined steady state, or from timing having passed for a predetermined time after having entered the invalid signal period, the predetermined time being from timing when the supply of power to the driver is started to timing when a current value flowing in the driver reaches a predetermined steady state, and the clock signal generation unit generates the predetermined clock signals from timing before the valid signal period by a predetermined time from timing when the driver power supply unit starts the supply of power to the driver to timing when a current value flowing in the driver reaches a predetermined steady state, or from timing having passed for a predetermined time after having entered the invalid signal period, the predetermined time being from timing when the driver power supply unit starts the supply of power to the driver to timing when a current value flowing in the driver reaches a predetermined steady state.

(4) The imaging device according to (2) or (3), wherein the predetermined clock signals include a vertical transfer clock signal, a horizontal transfer clock signal, a horizontal final stage transfer clock signal, and a reset gate clock signal.

(5) The imaging apparatus according to any of (1) to (4), wherein the clock signal generation unit further includes an OB clamp clock signal generation unit configured to generate an optical black (OB) clamp clock signal, and the OB clamp clock signal generation unit generates the OB clamp clock signal only during the valid signal period.

(6) An imaging method including:

a step of performing clock signal generation processing of starting generation of clock signals at predetermined timing when a clamp level does not vary, at a time of switching from a valid signal period in which an imaged video signal is transferred to an invalid signal period in which the video signal is not transferred.

(7) A program for causing a computer to execute processing including:

a clock signal generation step of starting generation of clock signals at predetermined timing when a clamp level does not vary, at a time of switching from a valid signal period in which an imaged video signal is transferred to an invalid signal period in which the video signal is not transferred.

(8) An electronic device including:

a clock signal generation unit configured to start, at a time of switching from a valid signal period in which an imaged video signal is transferred to an invalid signal period in which the video signal is not transferred, generation of clock signals at predetermined timing when a clamp level of the video signal does not vary.

REFERENCE SIGNS LIST

11 Control unit
12 Timing generation circuit
13 Vertical transfer clock driver
14 Horizontal transfer clock/horizontal final stage transfer clock driver
15 Reset gate clock driver
16 Imaging device
17 AFE
18 Signal processing circuit
19 Driver power supply unit
31 Vertical transfer clock generation unit
32 Horizontal transfer clock/horizontal final stage transfer clock generation unit
33 Reset gate clock generation unit
34 OB clamp clock generation unit
51, 51-1-1 to 51-M-N Sensor unit
52, 52-1 to 52-M Vertical register
53, 53-1-1 to 53-M-N Read-out gate unit
54 Vertical/horizontal shift control unit
55 Horizontal register
56 Charge-voltage conversion unit
71 OB clamp unit
72 CDS
73 ADC

The invention claimed is:

1. An imaging apparatus comprising:
a central processing unit (CPU) configured to:
control start of generation of clock signals at predetermined timing when a clamp level does not vary, at a time of switching from a valid signal period in which an imaged video signal is transferred to an invalid signal period in which the video signal is not transferred;
control a driver configured to transfer the imaged video signal according to the generated clock signals; and
control start of power to the driver from a predetermined time before the valid signal period.

2. The imaging apparatus according to claim 1, wherein the CPU is configured to control generation of predetermined clock signals, among the clock signals, from timing before the valid signal period by the predetermined time or from timing having passed from the invalid signal period by the predetermined time so that the clamp level of the video signal does not vary, and the imaged video signal is transferred in the valid signal period and the video signal is not transferred in the invalid signal period.

3. The imaging apparatus according to claim 1, wherein the CPU is configured to:
control the start of the supply of power to the driver from timing before the valid signal period by the predetermined time from timing when the supply of power to the driver is started to timing when a current value flowing in the driver reaches a predetermined steady state, or from timing having passed for the predetermined time after having entered the invalid signal period, the predetermined time being from timing when the supply of power to the driver is started to timing when a current value flowing in the driver reaches a predetermined steady state, and
control generation of predetermined clock signals, among the clock signals, from timing before the valid signal period by the predetermined time from timing when the supply of power to the driver is started to timing when a current value flowing in the driver reaches a predetermined steady state, or from timing having passed for the predetermined time after having entered the invalid signal period, the predetermined time being from timing when the supply of power to the driver is started to timing when a current value flowing in the driver reaches a predetermined steady state.

4. The imaging apparatus according to claim 2, wherein the predetermined clock signals include a vertical transfer clock signal, a horizontal transfer clock signal, a horizontal final stage transfer clock signal, and a reset gate clock signal.

5. The imaging apparatus according to claim 1, wherein the CPU is configured to:
control generation of an optical black (OB) clamp clock signal, and
generate the OB clamp clock signal only during the valid signal period.

6. An imaging method comprising:
starting generation of clock signals at predetermined timing when a clamp level does not vary, at a time of switching from a valid signal period in which an imaged video signal is transferred to an invalid signal period in which the video signal is not transferred; and
controlling start of supply of power to a driver configured to transfer the imaged video signal according to the generated clock signals,
wherein the supply of power to the driver is started from a predetermined time before the valid signal period.

7. A non-transitory computer-readable medium having stored thereon a set of computer-executable instructions for causing a computer to execute a method comprising:
starting generation of clock signals at predetermined timing when a clamp level does not vary, at a time of switching from a valid signal period in which an imaged video signal is transferred to an invalid signal period in which the video signal is not transferred; and controlling start of supply of power to a driver configured to transfer the imaged video signal according to the generated clock signals, wherein the supply of power to the driver is started from a predetermined time before the valid signal period.

8. An electronic device comprising:

a central processing unit (CPU) configured to:

control start of, at a time of switching from a valid signal period in which an imaged video signal is transferred to an invalid signal period which the video signal is not transferred, generation of clock signals at predetermined timing when a clamp level of the video signal does not vary;

control a driver configured to transfer the imaged video signal according to the generated clock signals; and control start of supply power to the driver from a predetermined time before the valid signal period.

* * * * *